(12) United States Patent
Kees et al.

(10) Patent No.: US 9,487,101 B2
(45) Date of Patent: Nov. 8, 2016

(54) VEHICLE CONTROL SYSTEM FOR ALIGNING INDUCTIVE CHARGING CONNECTION

(71) Applicant: FORD GLOBAL TECHNOLOGIES, LLC, Dearborn, MI (US)

(72) Inventors: Donatus Andreas Josephine Kees, Billericay (GB); Anthemios Philemon Petridis, Biship's Stortford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/625,236

(22) Filed: Feb. 18, 2015

(65) Prior Publication Data
US 2015/0231981 A1   Aug. 20, 2015

(30) Foreign Application Priority Data
Feb. 18, 2014   (GB) .................................. 1402843.5

(51) Int. Cl.
*B60L 11/18* (2006.01)
*B62D 15/02* (2006.01)
(Continued)

(52) U.S. Cl.
CPC .............. *B60L 11/1833* (2013.01); *B60L 1/14* (2013.01); *B60L 11/182* (2013.01);
(Continued)

(58) Field of Classification Search
CPC .............. B60L 11/1846; B60L 11/005; B60L 11/1816; B60L 11/182; B60L 11/1822; B60L 11/1861; B60L 11/1862; B60L 11/1868; B60L 18/1877; B60L 15/2045; B60L 2230/16; B60L 2240/12; B60L 2240/62; B60L 2240/622; B60L 2240/64; B60L 2240/642; B60L 2240/66; B60L 2240/662; B60L 2240/68; B60L 2240/72; B60L 2240/80; B60L 2250/10; B60L 2250/16; B60L 2250/18; B60L 2260/52; B60L 2260/54; B60L 2260/58; B60L 3/12; Y02T 10/7005; Y02T 90/16; Y02T 10/7291; Y02T 90/121; Y02T 90/128; Y02T 90/14; Y02T 90/162; Y02T 90/163; Y02T 90/169; Y04S 30/14
USPC ........................ 701/1, 22; 318/369; 320/108; 123/27 GE
See application file for complete search history.

(56) References Cited

U.S. PATENT DOCUMENTS 3,457,487 A * 7/1969 Cooper ................... H02P 7/298
                                                318/369
5,379,740 A * 1/1995 Moore ................ F02D 19/0605
                                                123/27 GE
(Continued)

FOREIGN PATENT DOCUMENTS

| GB | 2468578 A | 9/2010 |
|---|---|---|
| GB | 2500691 A | 10/2013 |
| GB | 2509720 A | 7/2014 |
| WO | 2011006884 A2 | 1/2011 |

*Primary Examiner* — Behrang Badii
*Assistant Examiner* — Sanjeev Malhotra
(74) *Attorney, Agent, or Firm* — David B. Kelley; Brooks Kushman P.C.

(57) ABSTRACT

A vehicle control system, a surface marking for a surface upon which a vehicle can be positioned and a method of positioning a vehicle is provided. The vehicle control system is configured to position a vehicle. The vehicle comprises a mobile inductive charging point. The vehicle control system comprises one or more parking sensors configured to determine the position of the vehicle relative to a surface upon which the vehicle is positioned and/or obstacles around the vehicle. The one or more parking sensors are further configured to locate a visual indicator indicating the position of a fixed inductive charging point relative to the vehicle, and a parking assistance controller configured to automatically park the vehicle in a parking space on the surface based on data from the one or more parking sensors.

8 Claims, 7 Drawing Sheets

(51) Int. Cl.
*B60L 1/14* (2006.01)
*G05D 1/02* (2006.01)

(52) U.S. Cl.
CPC ....... *B60L 11/1824* (2013.01); *B60L 11/1829* (2013.01); *B60L 11/1835* (2013.01); *B60L 11/1846* (2013.01); *B62D 15/0285* (2013.01); *G05D 1/0225* (2013.01); *G05D 1/0234* (2013.01); *B60L 2250/10* (2013.01); *B60L 2250/16* (2013.01); *G05D 2201/0213* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 8,483,899 B2 | 7/2013 | Martin | |
| 2006/0025897 A1* | 2/2006 | Shostak | B60C 23/005 701/1 |
| 2010/0094496 A1* | 4/2010 | Hershkovitz | B60L 3/12 701/22 |
| 2012/0089286 A1* | 4/2012 | Nakata | B60L 11/005 701/22 |
| 2012/0299538 A1* | 11/2012 | Arai | B60L 11/182 320/108 |
| 2013/0033228 A1* | 2/2013 | Raedy | H02J 7/0027 320/108 |
| 2013/0038715 A1 | 2/2013 | Ichikawa | |
| 2014/0092236 A1 | 4/2014 | Findeisen et al. | |

\* cited by examiner

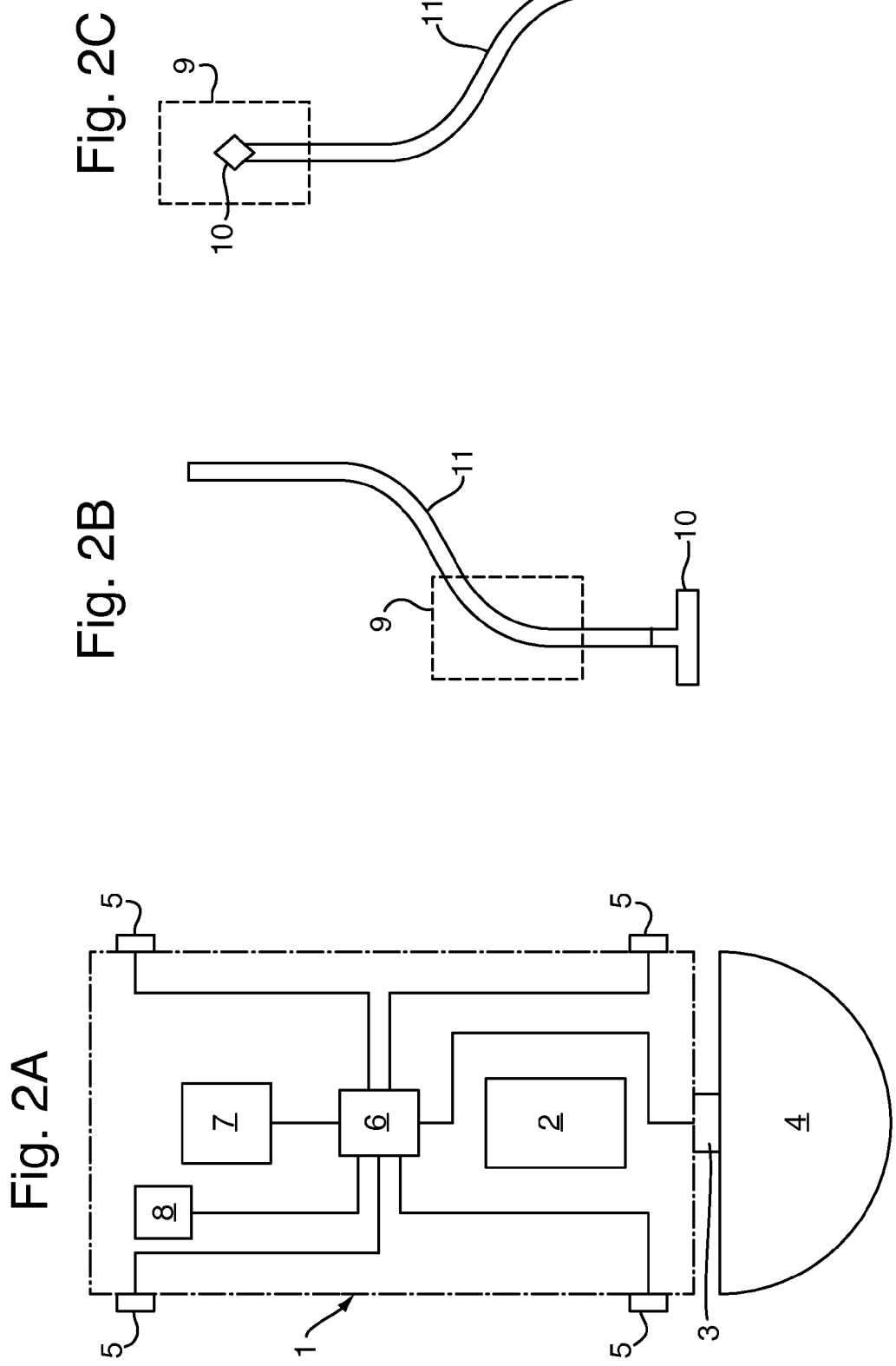

VEHICLE CONTROL SYSTEM FOR ALIGNING INDUCTIVE CHARGING CONNECTION

CROSS-REFERENCE TO RELATED APPLICATION

This application claims foreign priority benefits under 35 U.S.C. §119(a)-(d) to GB 1402843.5, filed Feb. 18, 2014, which is hereby incorporated by reference in its entirety.

TECHNICAL FIELD

This disclosure relates to a vehicle control system, in particular to a control system for a vehicle having a mobile inductive charging point. The vehicle control system is configured to control the vehicle such that the mobile inductive charging point is automatically aligned with a fixed inductive charging point, the fixed inductive charging point being located in a fixed location relative to the mobile inductive charging point. The alignment of the fixed and mobile inductive charging points ensures that an inductive charging flow can easily be established between the fixed and mobile inductive charging points.

BACKGROUND

It is known to use vehicle control systems to assist drivers in certain aspects of driving. For example, cruise control systems act to automatically maintain the speed of a vehicle at a speed set by a driver. Also, parking assistance systems can either assist a driver when parking a vehicle (for example, by controlling the direction of the vehicle when parking while the driver controls the speed), or can park a vehicle automatically without further driver input beyond activating the system.

To safely park a vehicle, parking assistance systems often include means for sensing the positions of vehicles, structures or other objects relative to the vehicle to be parked. The parking assistance systems record the positions of these objects, and then control the vehicle in such a way that the objects are avoided, such that the vehicle can be safely parked.

Also known, and increasing in popularity in several countries, are electric vehicles. Electric vehicles have been used in niche roles (milk delivery vehicles, golf carts, etc.) for some time, but quite recently electric vehicles have begun to replace ordinary vehicles for everyday road use.

In hybrid electric vehicles a portion of the output from a further vehicle mounted engine, typically a petrol or diesel engine, is used to charge a vehicle mounted battery pack. The vehicle mounted battery pack can then be used to provide movement power to the vehicle in addition to, or alternatively to, the further vehicle mounted engine. Hybrid electric vehicles therefore typically do not require an external power source to charge the vehicle mounted battery pack, though some hybrid electric vehicles are configured such that the vehicle mounted battery pack can be charged using an external power source if one is available.

Fully electric vehicles, which are vehicles which use an electric motor as their primary or only source of motive power, typically require external power sources in order to charge the vehicle mounted battery packs which power the engines.

Electric vehicles which can use external power sources to charge the battery packs are usually connected to the external power source using a conductive charging system based on a standard or three phase power cable. The power cable connects to an external power source, such as a connection point to a national power network, a stand alone power source or any other power source suitable for charging vehicle mounted battery packs, and also connects to the vehicle. Power can then be routed from the external power source to the vehicle, charging the vehicle.

Power cables can be a source of obstructions, potentially impeding the movement of vehicle users or other pedestrians. Also, vehicle users may forget to connect the power cable to the vehicle, or to the external power source, leading to the vehicle mounted battery packs failing to charge and potentially stranding the user with no motive power. If a power cable is connected to the external power source and the vehicle, but not disconnected before the vehicle moves away, this could potentially cause serious damage to the vehicle, the connection to the external power source and surrounding structures, vehicles and other objects. Conductive charging systems require a conductive connection to be made between the vehicle and the external power source, which could potentially lead to users being injured by electric shocks from the elements forming the conductive connection.

To obviate the issues surrounding power cables, prototype systems for charging electric vehicles using inductive charging systems are being developed. Inductive charging systems require no physical connection between an external power source and a vehicle to be charged. Instead, an electromagnetic field is used to transfer energy between two inductive charging points, which typically use induction coils to transfer the energy. An electromagnetic field is generated by a fixed inductive charging point connected to the external power source, and then the power from the field is received by a mobile inductive charging point on the vehicle to be charged and converted back into electrical energy.

There is no physical connection between the inductive charging points; the electromagnetic field propagates through the gap between the charging points. Therefore, there is no power cable to impede the movement of vehicle users or other pedestrians. As there is no power cable, it cannot be left connected between the vehicle and the external power source. Further, as there is no requirement for any physical connection between the vehicle and the external power source, it is possible for inductive charging systems to be configured to activate automatically, thereby reducing the possibility of the vehicle failing to charge. The removal of the physical connection also means that all of the elements carrying electrical power can be shielded behind insulating material, reducing the risk of a user suffering an electrical shock.

The transfer efficiency of inductive charging systems is a function of the separation between the inductive charging points. Therefore, in order to maximize the efficiency of the system it is advisable to position the inductive charging points of the vehicle and the external power source as close to one another as possible. Current prototype systems are configured such that the driver is responsible for aligning the fixed and mobile inductive charging points such that a connection between the two can be established. However, this can be a time consuming task for the driver, and it can be difficult for the driver to reliably position the vehicle in the optimal charging position for power transfer.

Certain examples described herein aim to avoid the above problems by providing assistance to the driver in the positioning of the vehicle. A parking assistance system may be configured to automatically detect the location of a fixed inductive charging point. When the location of a fixed inductive charging point has been determined, the parking assistance system is further configured to automatically position the vehicle relative to the detected location of the fixed inductive charging point such that the fixed and mobile inductive charging points are substantially aligned. In this way, an optimal connection between the fixed and mobile inductive charging points can be established. The system can either position the vehicle without driver input, or can assist the driver in positioning the vehicle. The parking assistance system can position the vehicle relative to the fixed inductive charging point faster and more reliably than the driver would be able to do without assistance from the parking assistance system. An optimal connection between the fixed and mobile inductive charging points helps to minimize the charging time, the energy lost during charging, and the cost of charging.

SUMMARY

There is provided a vehicle control system configured to position a vehicle, the vehicle comprising a mobile inductive charging point, wherein the vehicle control system comprises one or more parking sensors configured to determine the position of the vehicle relative to a surface upon which the vehicle is positioned and/or obstacles around the vehicle, wherein the one or more parking sensors are further configured to locate a visual indicator indicating the position of a fixed inductive charging point relative to the vehicle; and a parking assistance controller configured to automatically park the vehicle in a parking space on the surface based on data from the one or more parking sensors, wherein the parking assistance controller is further configured to use data from the one or more parking sensors to position the vehicle in an aligned position in which the fixed inductive charging point and the mobile inductive charging point are substantially aligned.

The fixed inductive charging point may be on or below the surface.

The parking sensors may be configured to locate a visual indicator that is on the surface upon which the vehicle is positioned.

The visual indicator may be substantially flat with respect to the surface upon which the vehicle is positioned. For example, the visual indicator may be substantially level with the surrounding surface. The visual indicator may be painted on the surface.

The parking assistance controller may be configured to determine the position of the vehicle relative to the fixed charging point when the vehicle has passed over the fixed inductive charging point and the location of the fixed inductive charging point is out of view of the one or more parking sensors.

The parking sensors may be configured to locate a visual indicator of the fixed inductive charging point that may be provided at least partially outside of the location of the fixed inductive charging point. The parking assistance controller may be configured to position the vehicle relative to the fixed inductive charging point based on the position of the visual indicator sensed by the one or more parking sensors.

The parking sensors may be configured to locate a visual indicator of the fixed inductive charging point that may comprise one or more lines indicating a parking trajectory indicator of the vehicle. The parking trajectory indicator may be configured to position the vehicle in the aligned position.

The parking sensors may be configured to locate a visual indicator of the fixed inductive charging point that may be arranged such that at least a portion of the visual indicator remains visible to the one or more parking sensors once the vehicle is in the aligned position.

The portion of the visual indicator that remains visible to the one or more parking sensors once the vehicle is in the aligned position may comprise a T-shaped portion.

The parking sensors may be configured to locate a visual indicator of the fixed inductive charging point that does not extend beyond the location of the fixed inductive charging point. The visual indicator may not be sensed by the one or more parking sensors once the vehicle has passed over the fixed inductive charging point, and the parking assistance controller may be configured to position the vehicle relative to the fixed inductive charging point based on the position of the visual indicator last sensed by the one or more parking sensors.

The parking assistance controller may be further configured to calculate the position and orientation of the vehicle since the visual indicator was last sensed based on the velocity and orientation of the vehicle.

At least one of the parking sensors may comprise a forward or reverse parking sensor.

The parking sensor may be a reverse parking sensor comprising a rear facing camera, or a forward parking sensor comprising a forward facing camera.

The reverse parking sensor or forward parking sensor may be the only parking sensor.

The parking assistance controller may be configured to assume control of the direction of the vehicle and/or the drive power of the vehicle.

The control system may be configured to locate a visual indicator indicating the position of a plurality of fixed inductive charging points.

A vehicle may comprise the above mentioned vehicle control system.

There is provided a surface marking for a surface upon which a vehicle can be positioned, the marking comprising a visual indicator on a surface indicating the position of a fixed inductive charging point, the visual indicator being arranged so as to be visible to a parking sensor of a vehicle comprising a mobile inductive charging point, the visual indicator being further arranged so as to aid a parking assistance controller using data from the one or more parking sensors to position the vehicle in an aligned position in which the fixed inductive charging point and the mobile inductive charging point are substantially aligned.

The visual indication may be configured to indicate the position of a fixed inductive charging point that is provided on or below the surface.

The visual indicator may comprise a discrete marker that is located on the fixed inductive charging point or a set distance away from the fixed inductive charging point.

The visual indicator may comprise a parking trajectory indicator that is configured to indicate an optimal trajectory for positioning the vehicle in an aligned position.

The visual indicator may be configured to indicate the positions of a plurality of fixed inductive charging points.

There is provided a method of positioning a vehicle, the vehicle comprising a mobile inductive charging point, wherein the method comprises determining with one or more parking sensors the position of the vehicle relative to a surface upon which the vehicle is positioned and/or obstacles around the vehicle, determining with the one or more parking sensors the location of a visual indicator indicating the position of a fixed inductive charging point relative to the vehicle, automatically parking the vehicle in a parking space on the surface based on data from the one or more parking sensors, and using data from the one or more parking sensors, positioning the vehicle in an aligned position in which the fixed inductive charging point and the mobile inductive charging point are substantially aligned.

Software, such as a computer program or a computer program product, and a computer readable medium having stored thereon a program is also provided. The software, when executed by a computing apparatus, may cause the computing apparatus to perform the above mentioned method of positioning a vehicle. A computer program may be stored on a computer-readable medium.

BRIEF DESCRIPTION OF THE DRAWINGS

FIG. 2A shows a schematic view of a vehicle comprising a vehicle control system;

FIG. 2B shows a schematic view of a visual indicator indicating the position of a fixed inductive charging point;

FIG. 2C shows a schematic view of an alternative visual indicator indicating the position of a fixed inductive charging point;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
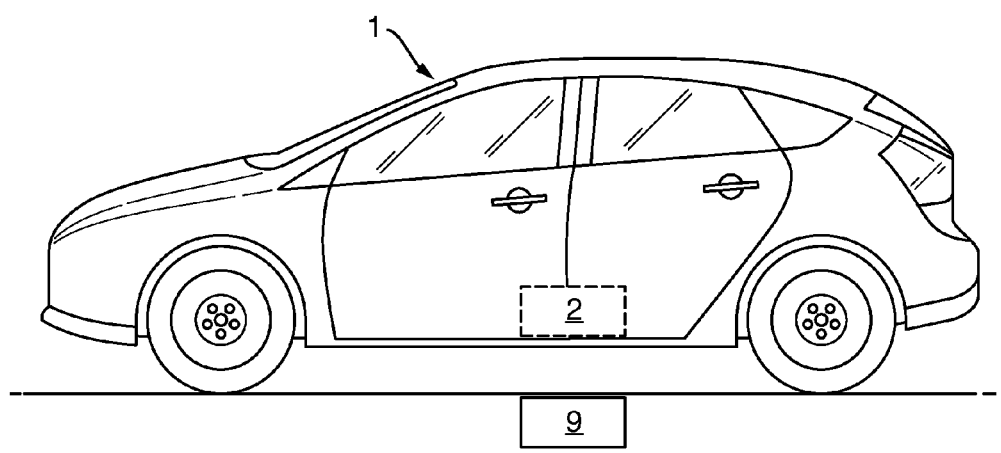
FIG. 1A shows a schematic side view of the alignment of a fixed inductive charging point and a mobile inductive charging point.
Figure 1B:
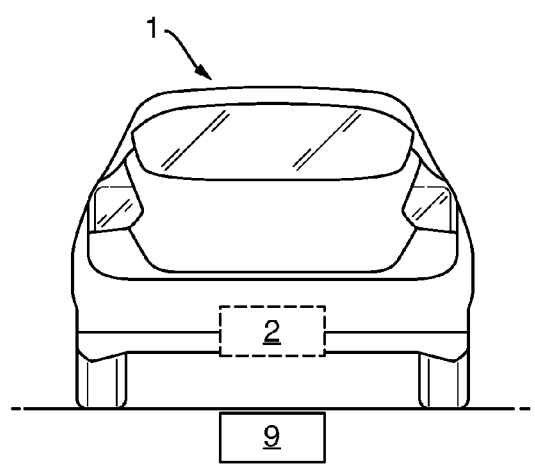
FIG. 1B shows a schematic rear view of the alignment of a fixed inductive charging point and a mobile inductive charging point.

FIG. 1 shows a schematic view, in which a fixed inductive charging point 9 (FICP) is located below the surface upon which a vehicle 1 can be positioned, and at least one mobile inductive charging point 2 (MICP) is located on the bottom of the vehicle 1. In the figures, the mobile inductive charging point 2 and fixed inductive charging point 9 are substantially aligned, such that power can flow between the two inductive charging points 2, 9. FIG. 1A shows the location of the inductive charging points 2, 9 relative to the side of the vehicle 1, and FIG. 1B shows the location of the inductive charging points 2, 9 relative to the rear of the vehicle 1. As illustrated by FIGS. 1A and 1B, in the substantially aligned position, the inductive charging points 2, 9 are aligned in the horizontal plane, such that the mobile inductive charging point 2 is positioned directly above the fixed inductive charging point 9.

As alternatives to the configuration shown in FIGS. 1A and 1B, a further or alternative mobile inductive charging point 2 may be located in any of the sides of the vehicle 1 (including the front and rear of the vehicle 1), or may be located in the roof of the vehicle 1. A corresponding fixed inductive charging point 9 may then be located next to the vehicle 1 (for example, in a wall or on a free standing unit), or may be supported above the vehicle 1. The relative dimensions of the fixed inductive charging point 9, mobile inductive charging point 2 and vehicle 1 are given purely for illustrative purposes.

FIG. 2A shows a schematic view of a vehicle 1 comprising a vehicle control system. In FIG. 2A a parking sensor 3, in particular a rear mounted parking sensor 3, is fitted to the vehicle 1. The vehicle 1 may comprise additional rear mounted parking sensors 3, and may also comprise further parking sensors 3 that are front mounted, side mounted, or mounted on the top or bottom of the vehicle 1.

The parking sensor or sensors 3 may comprise a camera based system, wherein one or more cameras are directed away from the vehicle 1. The cameras may each have a separate and distinct field of view 4, or the fields of view 4 of the cameras may overlap. The camera may comprise a fish eye lens. The camera may point in a direction with a component directed toward the surface. In particular, the camera may have a view of the surface behind the vehicle, for example, below and/or beyond a rear bumper of the vehicle. The cameras may record in the visible region of the electromagnetic radiation spectrum, or may use another region of the electromagnetic radiation spectrum, for example, the infrared region. The feed from the cameras may be in color or black and white, and may be compressed before analysis.

The parking sensor or sensors 3 may additionally or alternatively comprise radar sensors. The radar sensors may use combined transmitters and receivers, or may use separate transmitters and receivers. The sensors may also use other systems that use a similar principle to radar but that operate in a different region of the electromagnetic spectrum, such as visible light based lidar systems.

Further sensors 5 may be provided, for example, along the side of the vehicle 1. The further sensors 5 may be configured to detect the size of spaces between parked vehicles. The further sensors 5 may also be used during a parking maneuver, for example, to detect when the front or rear of the vehicle 1 has passed an adjacent vehicle. The further sensors 5 may comprise ultrasonic sensors, or any other type of sensor for detecting the presence of vehicles or other obstacles.

Additional sensors which do not rely on a visual indicator may also be used in addition to the primary parking sensors 3. For example, the system may further comprise one or more RFID receivers, while corresponding RFID tags are used to indicate the location of a fixed inductive charging point 9. A single RFID tag may be used for each fixed inductive charging point 9, or a series of tags may be used to delineate the shape of the tag. The fixed inductive charging points 9 may be arranged in groups, with the relative positions of the group and the individual fixed inductive charging points 9 within the group indicated by a single RFID tag for each fixed inductive charging point 9, or with a series of tags for each fixed inductive charging point 9. Also, where the system is used in a location where a constant line of approach to the fixed inductive charging point 9 is appropriate, a line of RFID tags may be used to indicate the optimal approach path for the vehicle 1 to the fixed inductive charging point 9.

The system may also or alternatively comprise a satellite signal receiver based positioning system, such as a GPS-based system. The satellite signal receiver based system may comprise a database stored in the vehicle 1 or accessible to the vehicle 1 (e.g., using a mobile internet connection), wherein the database includes a record of the locations of fixed inductive charging points 9. The system may query this database to determine the general location of a fixed inductive charging point 9 and display this information to the driver of the vehicle 1. When the vehicle 1 is in close proximity to the fixed inductive charging point 9, the positioning of the vehicle 1 can be performed using data from another part of the system, such as a camera system if one is included.

The system may also or alternatively include a positioning system based on inductive sensors. The system may include an inductive sensor which is configured to detect inductive targets, such as metallic objects, which are used to indicate the location of a fixed inductive charging point 9 or the best line of approach to a fixed inductive charging point 9, similar to the optional RFID based system. Alternatively or additionally, the inductive sensor system may utilize the mobile inductive charging point 2 and fixed inductive charging point 9. In the case where the inductive sensor system utilizes the mobile inductive charging point 2 and fixed inductive charging point 9, the power transfer between the fixed and mobile inductive charging points 2, 9 may be used to evaluate the relative positioning of the inductive charging points 2, 9. The position of the vehicle 1 can then be altered in order to maximize the power transfer, that is, to substantially align the fixed and mobile inductive charging points 2, 9.

Additional positioning systems may also or alternatively be used in conjunction with the above positioning systems.

The sensors may be positioned in any suitable location, for example, in front and/or rear bumpers of the vehicle 1, in the frames surrounding the windows of the vehicle 1 and/or in the sills of doors.

The system is configured to analyze the readouts provided by the sensors 3, and to use these readouts to compile a map of the objects surrounding the vehicle 1. For example, where the sensors 3 include cameras, the readout from the cameras can be analyzed using feature point analysis to compile the map. The analysis also includes checking for a visual indicator indicating the location of a fixed inductive charging point 9. When a visual indicator indicating the location of a fixed inductive charging point 9 is detected, the location of this charging point relative to the vehicle 1 and also the objects surrounding the vehicle 1 is then logged by the system.

The readout from the parking sensor or sensors 3 is interpreted by a parking assistance controller 6 (as shown in FIG. 2A) to determine the position of the vehicle 1 relative to other objects. The parking assistance controller 6 may be responsible for controlling only the vehicle control system configured to position the vehicle 1, or may be incorporated within a broader vehicle control system which also manages other components of the vehicle 1, such as the engine, lighting or alarm systems.

The parking assistance controller 6 may be connected to a vehicle acceleration controller 7, or may incorporate the vehicle acceleration controller 7. The parking assistance controller 6 may alternatively or additionally be connected to or incorporate the vehicle braking controller. The parking assistance controller 6 may alternatively or additionally be connected to or incorporate the vehicle steering control system 8. The parking assistance controller 6 may alternatively or additionally be connected to or incorporate a gear control system e.g. for selecting appropriate forward and reverse gears. Alternatively, the parking assistance controller 6 may be connected to or incorporate none of the other control systems of the vehicle 1. In FIG. 2A, the parking assistance controller 6 is connected to the vehicle acceleration controller 7 and the vehicle steering control system 8.

Where the parking assistance controller 6 can directly influence the vehicle steering system, the parking assistance controller 6 may, once activated, assume control of the vehicle steering to position the vehicle 1 such that the fixed and mobile inductive charging points 2, 9 may be substantially aligned. Also, where the parking assistance controller 6 can influence the vehicle engine system, the parking assistance controller 6 may, once activated, assume control of the vehicle engine power to control acceleration and position the vehicle 1 such that the fixed and mobile inductive charging points 2, 9 may be substantially aligned. Further, where the parking assistance controller 6 can influence the vehicle braking system, the parking assistance controller 6 may, once activated, assume control of the vehicle braking to position the vehicle 1 such that the fixed and mobile inductive charging points 2, 9 may be substantially aligned.

Where the parking assistance controller 6 cannot directly influence one or more of the vehicle 1 systems, the parking assistance controller 6 may prompt the driver of the vehicle 1 to so control the systems to position the vehicle 1 such that the fixed and mobile inductive charging points 2, 9 may be substantially aligned. For example, the parking assistance controller 6 may prompt the driver to do one or more of: rotate the vehicle steering wheel to control the vehicle steering system; depress the brake pedal or accelerator pedal; or change gears (for example, between a forward gear and a reverse gear, or between two forward gears). The parking assistance controller 6 may prompt the driver in various ways, for example using aural prompts, visual prompts and/or physical prompts.

Where the prompts include aural prompts, the aural prompt may include a periodic tone, the periodicity of which is varied as a function of the separation between the fixed and mobile inductive charging points 2, 9. Alternatively, the aural prompt may include spoken instructions to the driver. For example, the driver could be instructed to turn right or to brake.

Where the prompts include visual prompts, the prompts may be displayed on a screen located in the passenger compartment that is visible to the driver. The prompts may additionally or alternatively be displayed on a head-up display (HUD) which is configured to be visible to the driver. For example a HUD may be projected onto the windscreen of the vehicle 1.

The visual prompts may include an arrow indicating the direction of the fixed inductive charging point 9 relative to the mobile inductive charging point 2. Additionally or alternatively, the visual prompt may include a marker indicating the location of the fixed inductive charging point 9. The vehicle control system may be further configured to display the optimal route for the vehicle 1 to follow to arrive at a position where the fixed and mobile inductive charging points 2, 9 are substantially aligned. If the system is configured to display the route, this may be indicated using visual prompts such as a continuous or broken line, a series of animated arrows or a series of gates that the vehicle 1 may be controlled to pass through.

Where the prompts include tactile prompts, the tactile prompts may include vibrating a control surface (such as a steering wheel or pedal) to indicate that the driver may perform an action.

The position of the fixed inductive charging point 9 is identified to the vehicle control system by a visual indicator. FIG. 2B shows a fixed inductive charging point 9, wherein the fixed inductive charging point 9 is just below the surface. The location of the fixed inductive charging point 9 is indicated by the visual indicator. The visual indicator may comprise one or more discrete markers 10 positioned a set distance away from the fixed inductive charging point 9 (as shown in FIG. 2B), wherein the discrete marker may indicate the location of the fixed inductive charging point 9. For example, the marker may be positioned a meter away from the fixed inductive charging point 9, and may include an arrow or other indicator to the direction of the fixed inductive charging point 9 relative to the marker. Alternatively or additionally, one or more discrete markers 10 may be positioned on or around the fixed inductive charging point 9. FIG. 2C shows a discrete marker positioned on the fixed inductive charging point 9.

Figure 3A:
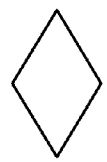
FIGS. 3A to 3I show various discrete marker shapes.
Figure 3B:
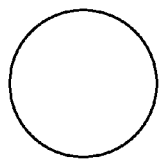
Figure 3C:
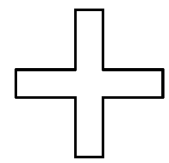
Figure 3D:
Figure 3E:
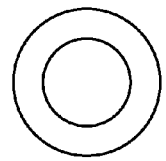
Figure 3F:
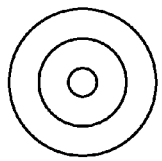
Figure 3G:
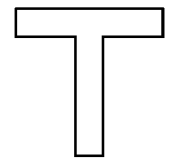
Figure 3H:
Figure 3I:
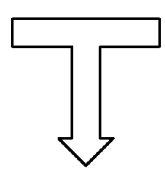
Figure 3J:
FIGS. 3J to 3L show various parking trajectory indicator shapes.
Figure 3K:
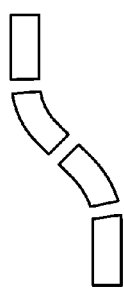

A discrete marker 10 for a visual indicator may take any appropriate form. Examples of appropriate forms are shown in FIG. 3. The forms include a diamond (FIG. 3A), a circle (FIG. 3B), a cross (FIG. 3C), a square (FIG. 3D), a ring (FIG. 3E), a target (FIG. 3F), a T-shape (FIG. 3G), an arrow (FIG. 3H) and an arrow with a T-shape (FIG. 3I). Also, the appropriate forms may be combined in any combination to form a further appropriate form. In cases where the discrete marker 10 is positioned a set distance away from the fixed inductive charging points 9, the discrete marker 10 may indicate the direction of the fixed inductive charging point 9 relative to the discrete marker 10. The indication can take the form of an arrow, as illustrated by FIGS. 3H and 3I, or a separate indicator positioned close to the discrete marker 10.

Figure 3L:
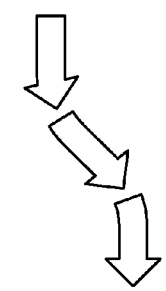

In addition to or alternatively to the discrete marker 10, the visual indicator may comprise a series of lines or arrows forming a parking trajectory indicator 11 that indicates a parking maneuver trajectory for the vehicle 1 to follow such that the fixed and mobile inductive charging points 2, 9 are substantially aligned. Examples of the parking maneuver trajectory include a solid line (FIG. 3J), a dashed line (FIG. 3K) and a series of arrows (FIG. 3L).

The parking trajectory indicator 11 may provide feedback via the parking sensor or sensors 3 to the vehicle control system, such that the control system can adjust for deviations from the trajectory indicated by the parking trajectory indicator 11.

A discrete marker 10 may be provided at either or both ends of the parking trajectory indicator 11. The same or a different discrete marker 10 may be provided at either end of a parking trajectory indicator 11. The parking trajectory indicator may or may not pass over the fixed inductive charging point 9. One end of the parking trajectory indicator may be positioned over the fixed inductive charging point 9.

The fixed inductive charging points 9 may be arranged in groups, wherein a group may consist of a plurality of fixed inductive charging points in close proximity to one another that may, e.g. share visual indicators. The fixed inductive charging points 9 may be arranged, for example, in a charging bay configuration. The fixed inductive charging points 9 may be arranged in a grid formation having one or more shared entry and exit ways, such that the maximum number of vehicles may be arranged for charging in a space efficient way. The fixed inductive charging points may also be arranged in any other suitable configuration.

Where the fixed inductive charging points 9 are arranged in groups, a single parking trajectory indicator 11 may be used to indicate a parking maneuver trajectory for the vehicle 1 to follow such that the fixed and mobile inductive charging points 2, 9 are substantially aligned. FIG. 4 shows an example of a group arrangement of fixed inductive charging points 9. In the example shown in FIG. 4, the parking trajectory indicator 11 passes over the fixed inductive charging points 9, but the parking trajectory indicator 11 need not necessarily do so. FIG. 4 shows discrete markers 10 that are positioned near to the fixed inductive charging points 9, but equally one or a plurality of discrete markers 10 may be positioned on or around each of the fixed inductive charging points 9, or a single discrete marker 10 may be used to indicate the positions of a plurality of fixed inductive charging points 9.

Discrete markers 10 may be used to indicate if a fixed inductive charging point 9 is the first of the fixed inductive charging points 9 on a parking trajectory indicator 11, the second of the fixed inductive charging points 9 on a parking trajectory indicator 11, the penultimate of the fixed inductive charging points 9 on a parking trajectory indicator, the last of the fixed inductive charging points 9 on a parking trajectory indicator 11, or other positions of a fixed inductive charging point 9 relative to other fixed inductive charging points 9 on a parking trajectory indicator 11.

Various different discrete markers 10 may be used on or near a single parking trajectory indicator 11. The discrete markers 10 may also be used to indicate the position of the parking trajectory indicator 11 relative to other parking trajectory indicators (indicating the positions of other fixed inductive charging points 9). For example, the discrete markers 10 may be used to indicate that a parking trajectory indicator 11 is the second from the left of a group of parking trajectory indicators in a particular group of fixed inductive charging points 9.

Figure 4A:
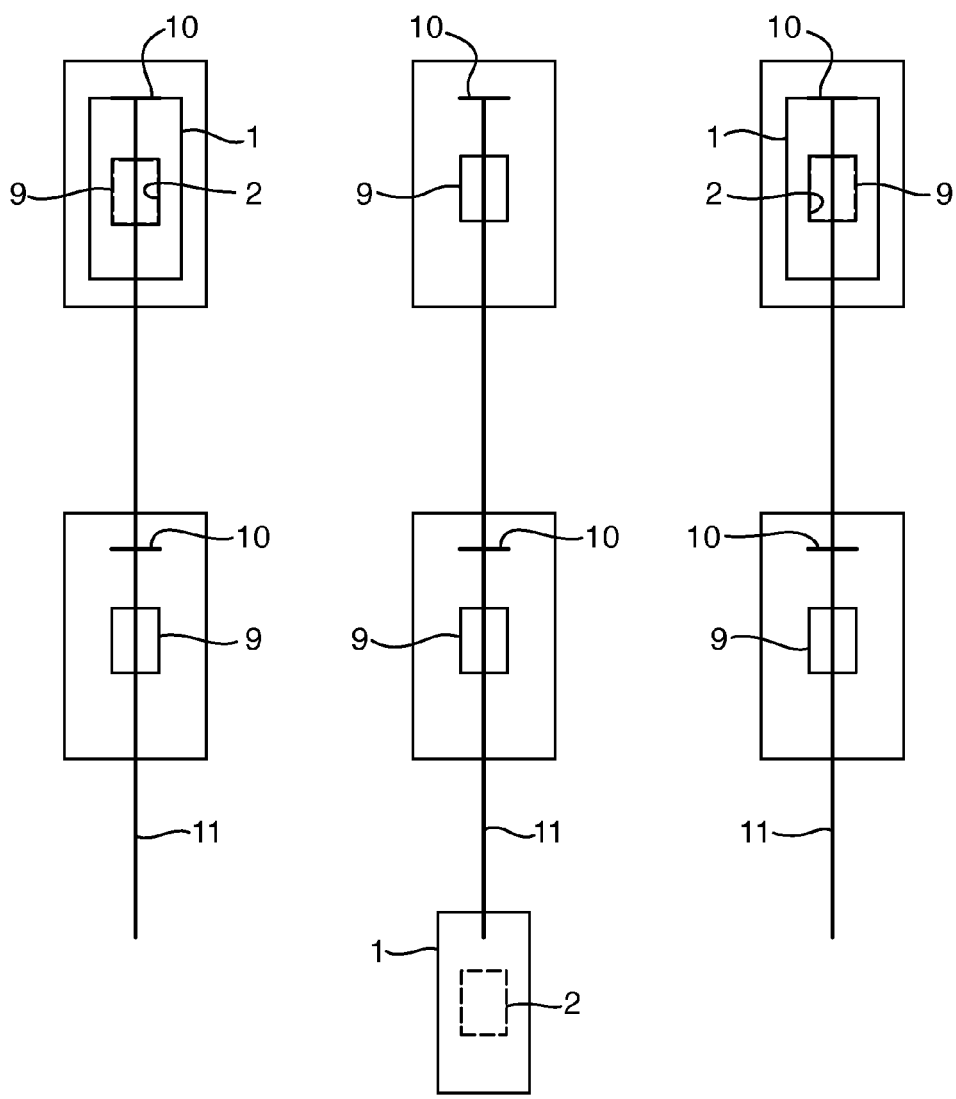
FIG. 4A shows an example of a configuration of fixed inductive charging points and visual indicators.
Figure 4B:
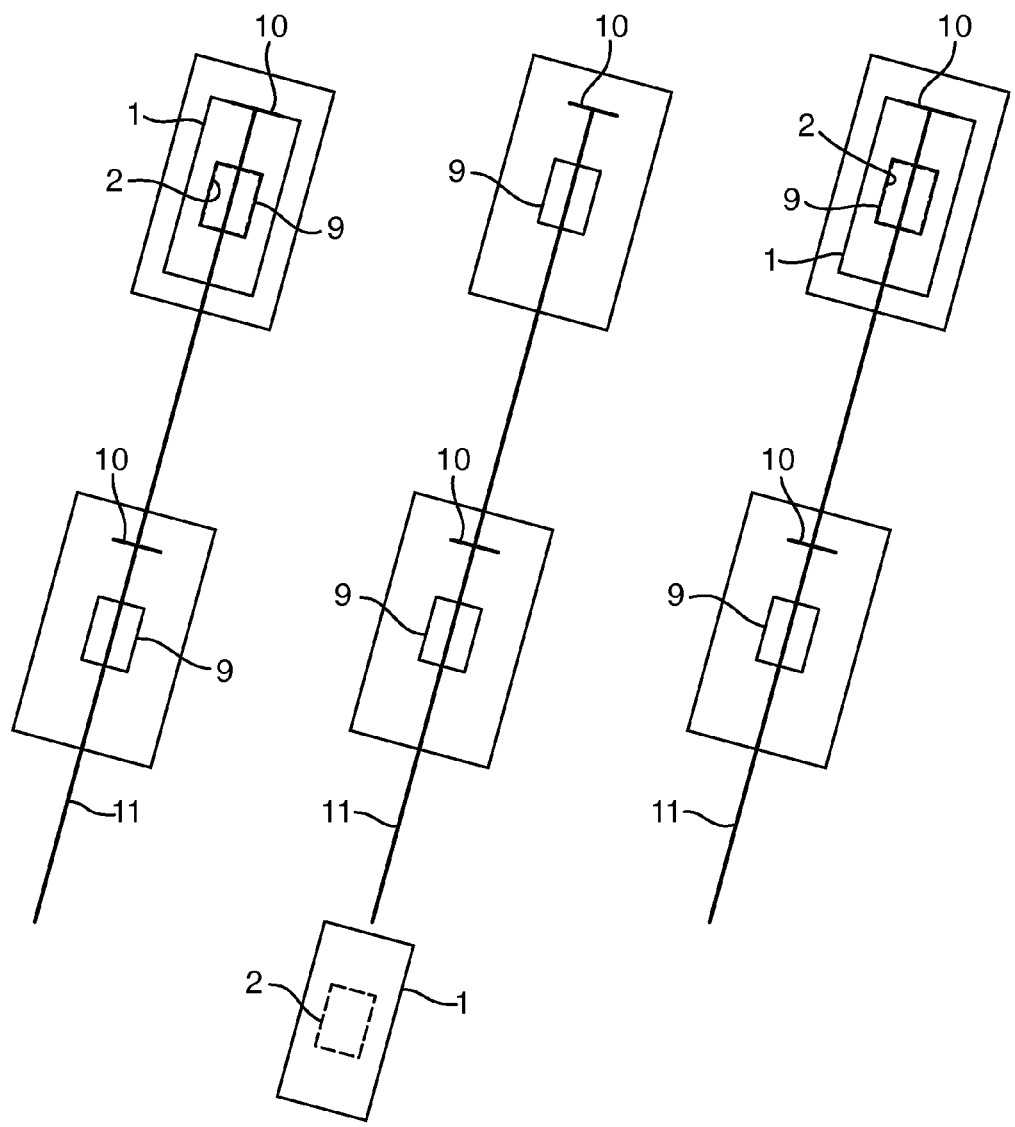
FIG. 4B shows an alternative example of a configuration of fixed inductive charging points and visual indicators.

FIG. 4A shows an example of a group of fixed inductive charging points 9, in which six fixed inductive charging points 9 are located in close proximity to one another, and share three parking trajectory indicators 11, in a straight grid formation. Each of the fixed inductive charging points 9 is identified by a discrete marker 10 which is positioned a set distance in a known direction away from the fixed inductive charging point 9. FIG. 4A also shows three vehicles 1; two of which have completed reverse parking maneuvers and are charging at the fixed inductive charging points 9, and one of which is approaching a fixed inductive charging point 9 by performing a forward parking maneuver along a parking trajectory indicator 11 (the center vehicle). FIG. 4B shows an alternative configuration, in which six fixed inductive charging points 9 are located in close proximity to one another, and share three parking trajectory indicators 11, in an angled grid formation. The particular arrangements of the fixed inductive charging points 9, discrete markers 10 and parking trajectory indicators 11 shown in FIGS. 4A and 4B are purely illustrative, and any other appropriate configuration may also be used.

Both the discrete marker 10 and the parking trajectory indicator 11 of the visual indicator may lie substantially in the plane of the surface. That is, the visual indicator may not substantially protrude above the surface, or require a substantial indentation to be made into the surface. If the visual indicator extends into the material forming the surface (such as concrete or asphalt), the visual indicator may be configured so as to be substantially flush with the surface when in position. Any protrusion of the visual indicator from the plane of the surface may not exceed 10 mm in either direction (that is, out of the surface or into the surface). If the visual indicator does not protrude substantially from the plane of the surface, the visual indicator may not significantly impede the progress of vehicles or pedestrians using the surface for purposes other than inductive charging. Vehicles and pedestrians can cross the surface without being impeded by the surface topography. Therefore, the visual indicators can be positioned on surfaces that serve multiple purposes, such as the surfaces of roads. By contrast, if the visual indicator includes or requires significant changes in the surface topography, this may prevent the surface from being used for purposes other than inductive charging of vehicles, which may limit the visual indicators to use specifically in locations used for the charging of electrical vehicles, and prevent the visual indicators from being used on other surfaces. If the visual indicators are formed using, for example, road marking paint, protrusion from the surface may not be a significant issue.

Figure 5A:
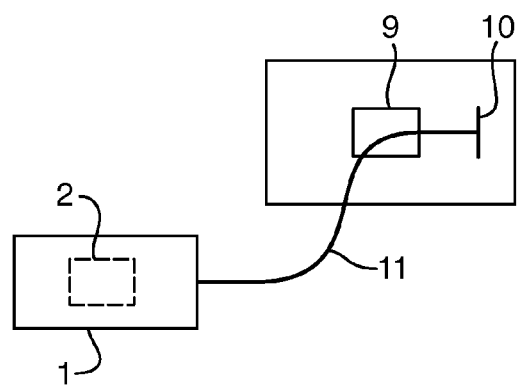
FIGS. 5A to 5C show a parking maneuver trajectory of a vehicle using a visual indicator.
Figure 5B:
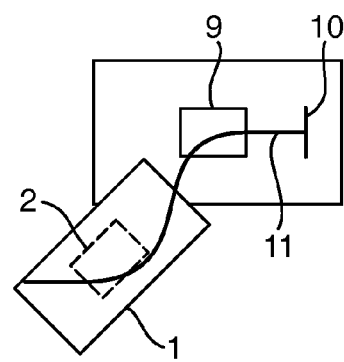
Figure 5C:
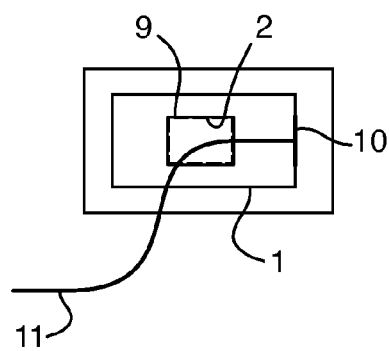
Figure 6A:
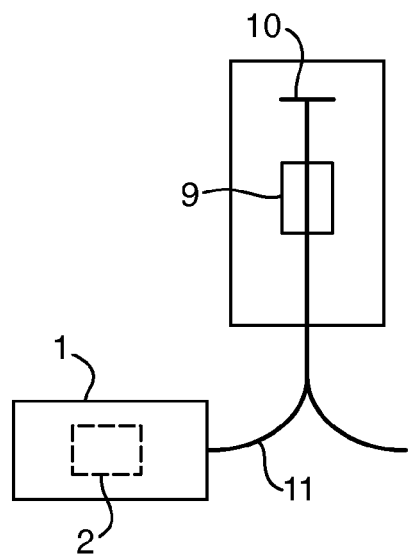
FIGS. 6A to 6C show an alternative parking maneuver trajectory of a vehicle using an alternative visual indicator.
Figure 6B:
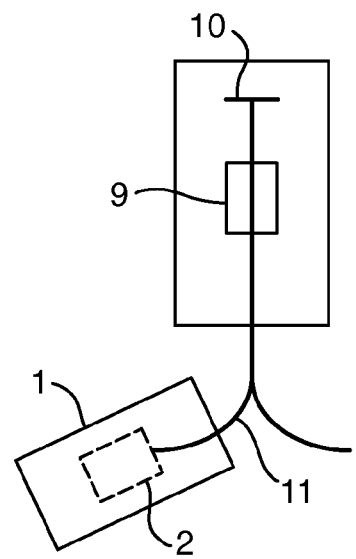
Figure 6C:
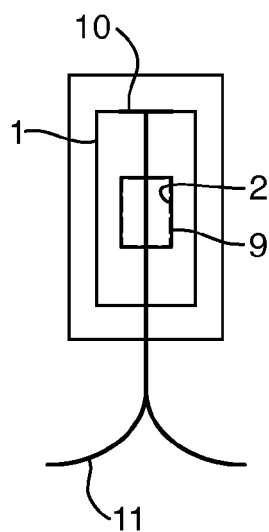

FIGS. 5 and 6 both show a visual indicator combining a single discrete marker 10, indicating the location of a single fixed inductive charging point 9, with a parking trajectory indicator 11. FIGS. 5A to 5C show a parking maneuver trajectory for when the vehicle 1 is to be parked parallel to the primary direction of travel of the vehicle 1, for example, in a roadside parking space. FIGS. 6A to 6C show a parking maneuver trajectory for when the vehicle 1 is to be parked substantially perpendicular to the primary direction of travel of the vehicle 1, for example, in a car park. The parking maneuver trajectories shown in FIGS. 5 and 6 are illustrative examples only; other trajectories may be more appropriate for different configurations of fixed inductive charging points 9 and surrounding objects.

FIGS. 5A to 5C show a vehicle 1 approaching a fixed inductive charging point 9, wherein the visual indicator consists of a discrete marker 10 (in this case a T-shaped marker) and a parking trajectory indicator 11 (in this case a continuous line). In FIG. 5A, the vehicle 1 approaches the start of the parking trajectory indicator 11 in reverse, and the vehicle control system is activated. The vehicle 1 is equipped with at least a rear mounted camera as a parking sensor 3. The rear mounted camera detects the parking trajectory indicator 11. The vehicle control system registers the start of the parking maneuver trajectory, and controls the direction of the vehicle 1 such that the vehicle 1 begins to follow the path indicated by the parking trajectory indicator 11.

FIG. 5B shows the vehicle 1 following the parking maneuver trajectory, part way through the parking maneuver. The vehicle control system controls the speed and/or direction of the vehicle 1 such that it continues to follow the parking maneuver trajectory into the parking space. If the positioning of objects around the parking space necessitates, the vehicle 1 may reposition or deviate from the parking maneuver trajectory as required. The parking maneuver trajectory indicates the optimal approach path to the fixed inductive charging point 9, but it may not be possible to follow this path if the path is obscured by other objects. If it is not possible to follow the path, the system may be configured to follow an alternative path as objects allow.

FIG. 5C shows the vehicle 1 at the end of the parking maneuver. The vehicle 1 has followed the parking trajectory indicator 11 and has stopped at the discrete marker 10. As shown in the figure, the discrete marker 10 may be positioned a set distance away from the fixed inductive charging point 9. The T-shape of the discrete marker 10 may be used to indicate the direction of the fixed inductive charging point 9 relative to the vehicle 1. The mobile inductive charging point 2 is located a known distance from the rear of the vehicle 1. The vehicle control system uses the known distance and the set distance to position the vehicle 1 in such a way that the fixed and mobile inductive charging points 2, 9 are substantially aligned. The set distance shown in the figure may be set such that the discrete marker 10 remains visible to the parking sensor 3 throughout the parking maneuver, up to and including the time when the fixed inductive charging point 9 and mobile inductive charging point 2 are aligned.

FIGS. 6A to 6C show a parking maneuver trajectory for when the vehicle 1 is to be parked substantially perpendicular to the primary direction of travel of the vehicle 1, for example, in a car park. The configuration of the vehicle 1 shown in FIGS. 6A to 6B is the same as that for the vehicle 1 shown in FIGS. 5A to 5C.

In FIG. 6A, the vehicle 1 approaches the start of the parking trajectory indicator 11 in reverse, and the vehicle control system is activated. FIG. 6B shows the vehicle 1 part way through the parking maneuver, and FIG. 6C shows the vehicle 1 at the end of the parking maneuver. As is the case for the visual indicator shown in FIGS. 5A to 5C, the discrete marker 10 is positioned a set distance away from the fixed inductive charging point 9. The T-shape of the discrete marker 10 may be used to indicate the direction of the fixed inductive charging point 9 relative to the vehicle 1. The vehicle control system uses this information to correctly position the vehicle 1. Again, the set distance shown in the figure may be set such that the discrete marker 10 remains visible to the parking sensor 3 throughout the parking maneuver, up to and including the time when the fixed inductive charging point 9 and mobile inductive charging point 2 are aligned.

In the examples shown in FIGS. 5 and 6, the visual indicator can be detected by the parking sensors 3 throughout the parking maneuver. However, the visual indicator may not be visible to the parking sensors 3 throughout the parking maneuver. For example, if a discrete marker 10 is used that is comparatively small relative to the vehicle 1 and that is positioned directly on top of the fixed inductive charging point 9, the visual indicator may not be visible when the fixed and mobile inductive charging points 2, 9 are close to being aligned. In such instances, the vehicle control system is configured to register the position of the fixed inductive charging point 9 for as long as this point is visible. When the visual indicator indicating the position of the fixed inductive charging point 9 is no longer visible to the parking sensors 3, the vehicle control system is configured to determine the relative locations of the fixed inductive charging point 9 and mobile inductive charging points 2, 9 in other ways. For example, the vehicle control system may determine the relative positions by noting the orientation of the wheels of the vehicle 1 and the number of rotations of the wheels. Alternatively, the vehicle control system may determine the relative positions by judging the change in position of the vehicle 1 relative to surrounding objects, wherein the positioning of the surrounding objects is determined using the readouts from the parking sensors 3 or other sensing means. Also, in the examples shown in FIGS. 5 and 6, the vehicle 1 approaches the parking trajectory indicator 11 in reverse. The vehicle 1 may also approach a parking trajectory indicator 11, including the parking trajectory indicators shown in FIGS. 5 and 6, while travelling forwards.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle control system configured to position a vehicle, the vehicle comprising a mobile inductive charging point, wherein the vehicle control system comprises:
   one or more parking sensors configured to determine the position of the vehicle relative to a surface upon which the vehicle is positioned, wherein the one or more parking sensors are further configured to locate a visual indicator indicating the position of a fixed inductive charging point relative to the vehicle; and
   a parking assistance controller configured to automatically park the vehicle in a parking space on the surface based on data from the one or more parking sensors,
   wherein the parking assistance controller is further configured to use data from the one or more parking sensors to position the vehicle in an aligned position in which the fixed inductive charging point and the mobile inductive charging point are substantially aligned,
   wherein the parking sensors are configured to locate a visual indicator that is on the surface upon which the vehicle is positioned,
   wherein the visual indicator is substantially flat with respect to a plane of the surface upon which the vehicle is positioned, and
   wherein the parking assistance controller is configured to determine the position of the vehicle relative to the fixed charging point when the vehicle has passed over the fixed inductive charging point and the location of the fixed inductive charging point is out of view of the one or more parking sensors.

2. The vehicle control system of claim 1, wherein the parking sensors are configured to locate a visual indicator of the fixed inductive charging point that is provided at least partially outside of the location of the fixed inductive charging point and the parking assistance controller is configured to position the vehicle relative to the fixed inductive charging point based on the position of the visual indicator sensed by the one or more parking sensors.

3. The vehicle control system of claim 2, wherein the parking sensors are configured to locate a visual indicator of the fixed inductive charging point that comprises a vehicle trajectory indicator, wherein the vehicle trajectory indicator is configured to assist the vehicle control system in positioning the vehicle in the aligned position.

4. The vehicle control system of claim 3, wherein the parking sensors are configured to locate a visual indicator of the fixed inductive charging point that is arranged such that at least a discrete marker of the visual indicator remains visible to the one or more parking sensors once the vehicle is in the aligned position.

5. The vehicle control system of claim 4, wherein the discrete marker of the visual indicator that remains visible to the one or more parking sensors once the vehicle is in the aligned position comprises a T-shaped portion.

6. The vehicle control system of claim 1, wherein the parking sensors are configured to locate a discrete marker of the visual indicator of the fixed inductive charging point that does not extend beyond the location of the fixed inductive charging point, such that the discrete marker is not sensed by the one or more parking sensors once the vehicle has passed over the fixed inductive charging point, and the parking assistance controller is configured to position the vehicle relative to the fixed inductive charging point based on the position of the discrete marker last sensed by the one or more parking sensors.

7. The vehicle control system of claim 6, wherein the parking assistance controller is further configured to calculate the position and orientation of the vehicle since the discrete marker was last sensed based on a velocity and orientation of the vehicle.

8. A vehicle comprising:
   an inductive charging system;
   a sensor; and
   a controller configured to position the vehicle to align an inductive charging point of the inductive charging system with a fixed charging point associated with a parking surface based on data indicating relative position between the inductive and fixed charging points that is derived after the sensor has located and passed over an indicator flush with the surface indicating a position of the fixed charging point and after the indicator is beyond view of the sensor.

* * * * *